(12) United States Patent
Paul et al.

(10) Patent No.: US 11,073,888 B2
(45) Date of Patent: Jul. 27, 2021

(54) PLATFORM POWER MANAGER FOR RACK LEVEL POWER AND THERMAL CONSTRAINTS

(71) Applicants: Advanced Micro Devices, Inc., Santa Clara, CA (US); ATI Technologies ULC, Markham (CA)

(72) Inventors: Indrani Paul, Austin, TX (US); Sriram Sambamurthy, Austin, TX (US); Larry David Hewitt, Austin, TX (US); Kevin M. Lepak, Austin, TX (US); Samuel D. Naffziger, Fort Collins, CO (US); Adam Neil Calder Clark, Markham (CA); Aaron Joseph Grenat, Austin, TX (US); Steven Frederick Liepe, Fort Collins, CO (US); Sandhya Shyamasundar, Austin, TX (US); Wonje Choi, Austin, TX (US); Dana Glenn Lewis, Austin, TX (US); Leonardo de Paula Rosa Piga, Austin, TX (US)

(73) Assignees: ADVANCED MICRO DEVICES, INC., Santa Clara, CA (US); ATI TECHNOLOGIES ULC, Markham (CA)

( * ) Notice: Subject to any disclaimer, the term of this patent is extended or adjusted under 35 U.S.C. 154(b) by 93 days.

(21) Appl. No.: 16/428,312

(22) Filed: May 31, 2019

(65) Prior Publication Data
US 2020/0379544 A1 Dec. 3, 2020

(51) Int. Cl.
*G06F 1/00* (2006.01)
*G06F 1/3225* (2019.01)
*G06F 1/3234* (2019.01)
*G06F 1/3203* (2019.01)

(52) U.S. Cl.
CPC .......... *G06F 1/3225* (2013.01); *G06F 1/3275* (2013.01); *G06F 1/3203* (2013.01)

(58) Field of Classification Search
CPC ............................. G06F 1/3225; G06F 1/3275
USPC ........................................................ 713/300
See application file for complete search history.

(56) References Cited

U.S. PATENT DOCUMENTS

| | | | | |
|---|---|---|---|---|
| 2004/0030940 A1* | 2/2004 | Espinoza-Ibarra | ..... | G06F 1/206 713/300 |
| 2007/0033425 A1* | 2/2007 | Clark | .................... | G06F 1/3203 713/320 |
| 2007/0300083 A1* | 12/2007 | Goodrum | .............. | G06F 1/3203 713/300 |
| 2011/0022833 A1* | 1/2011 | Nussbaum | .............. | G06F 1/324 713/100 |
| 2011/0022857 A1* | 1/2011 | Nussbaum | ............ | G06F 1/3296 713/300 |

(Continued)

*Primary Examiner* — Volvick Derose
(74) *Attorney, Agent, or Firm* — Volpe Koenig (57) ABSTRACT

Platform power management includes boosting performance in a platform power boost mode or restricting performance to keep a power or temperature under a desired threshold in a platform power cap mode. Platform power management exploits the mutually exclusive nature of activities and the associated headroom created in a temperature and/or power budget of a server platform to boost performance of a particular component while also keeping temperature and/or power below a threshold or budget.

20 Claims, 6 Drawing Sheets

(56) References Cited

U.S. PATENT DOCUMENTS

| | | | |
|---|---|---|---|
| 2012/0137158 A1* | 5/2012 | Nelluri | H05K 7/1498 |
| | | | 713/340 |
| 2013/0055185 A1* | 2/2013 | Bose | H01L 23/50 |
| | | | 716/120 |
| 2013/0246820 A1* | 9/2013 | Branover | G06F 1/324 |
| | | | 713/320 |
| 2014/0068282 A1* | 3/2014 | Jenne | G06F 1/3234 |
| | | | 713/300 |
| 2014/0068284 A1* | 3/2014 | Bhandaru | G06F 1/3225 |
| | | | 713/300 |
| 2014/0089699 A1* | 3/2014 | O'Connor | G06F 1/3243 |
| | | | 713/322 |
| 2014/0189297 A1* | 7/2014 | Narvaez | G06F 9/45558 |
| | | | 712/29 |
| 2014/0201542 A1* | 7/2014 | Kommrusch | G06F 1/30 |
| | | | 713/300 |
| 2015/0067356 A1* | 3/2015 | Trichy Ravi | G06F 1/3287 |
| | | | 713/300 |
| 2015/0355692 A1* | 12/2015 | Paul | G06F 1/3206 |
| | | | 713/322 |
| 2016/0026231 A1* | 1/2016 | Ignowski | G06F 1/3275 |
| | | | 713/320 |
| 2017/0160781 A1* | 6/2017 | Piga | G06F 1/3206 |
| 2017/0212575 A1* | 7/2017 | Wang | G06F 1/206 |

\* cited by examiner

PLATFORM POWER MANAGER FOR RACK LEVEL POWER AND THERMAL CONSTRAINTS

BACKGROUND

Processors in servers are being designed with an increasingly higher thermal design point (TDP). A higher TDP imposes rack level power constraints and thermal constraints on server systems. Likewise, performance maximization is a priority for server products. Conventional management of platform level power includes increasing the power budget of a server and/or components of the server to improve performance at the expense of increased cooling costs and an increased need to more sparsely fill rack space. Such conventional management of platform level power causes disproportionate increases in power consumption, which increases platform temperature and, in turn, increases cooling cost.

Conventionally, server power budgeting is typically done based on an assumption of worst case realistic power consumption of all platform components including a quoted processor TDP and worst case cooling capabilities. In reality, not all components run at worst case power levels, which leaves unutilized headroom. Moreover, conventional platform power management does not take advantage of the mutual exclusive nature of how different components, for example a processor and memory, are used.

Additionally, although performance is often the priority for server products, data centers are also often power budgeted. As such, it is important to maximize performance for a given budget using existing infrastructure. At times, it is detrimental to boost performance when operating with a limited power budget and/or with a targeted cooling cost.

A solution to the above deficiencies of conventional platform power management is needed to provide better aggregate performance across the platform when adhering to power supply limits through platform power capping. There is also a need to manage platform power by boosting component performance when sufficient untapped platform headroom is available.

BRIEF DESCRIPTION OF THE DRAWINGS

A more detailed understanding can be had from the following description, given by way of example in conjunction with the accompanying drawings wherein.

DETAILED DESCRIPTION

A platform power manager (PPM) controls server processor performance by either boosting performance in a platform power boost (PPB) mode or restricts performance to keep a power or temperature under a desired threshold in a platform power cap (PPC) mode. PPB mode favors platform performance over platform power, and PPC mode favors platform power over platform performance.

When the PPM operates in PPB mode, server performance is maximized by shifting power limits across a plurality of processors, systems-on-chip (SoC), and other platform components depending on a platform power headroom and temperature headroom and based on workload characteristics. This enables an expanded range of a power envelope beyond the TDP for which a processor/SoC is specified without a need for new system power budget provisioning and hence new datacenter power provisioning. In one example, the PPM receives platform power targets, infers optimization criteria for the platform, detects situations for optimization while in operation, and programmably tunes server performance without violating infrastructure constraints. When the PPM operates in PPC mode, the server performance is reduced to adhere to thermal and/or power budget constraints.

In PPB mode, available platform power and/or temperature headroom is utilized to boost a performance level, for example a processor frequency. In one example, a platform running in PPB mode is capable of sustaining a boosted processor frequency beyond its TDP without requiring additional infrastructure cost by exploiting platform-level power and thermal headroom. For example, during a compute-intensive activity, the memory is not intensively used, which affords extra power and/or thermal headroom at the platform level. In one example, during PPB mode, the workloads are monitored and characterized as processor-intensive. Furthermore, measurements of platform power and temperature are gathered to assess possible platform-level headroom. Based on the workload characterization and the measurements, the processor can be boosted above TDP to take advantage of the extra headroom.

In PPC mode, inputs are used for constraining one or more processors to run within platform-level and rack-level power and/or thermal constraints. In one example, inputs can be received from a customer dynamically or can be programmed statically into the basic input/output system (BIOS) to set constraints. In one example, using the inputs in PPC mode, the platform power is adjusted to reduce cooling costs at non-peak times of the week, which lowers operating costs for an associated data center.

In accordance with the examples provided herein, the PPM controls platform performance based on a customer-selected thermal constraint. For example, a customer may wish to constrain the system based on a temperature at the airflow outlet of a power supply, based on a temperature at the airflow inlet of the server platform, based on a processor temperature, based on a memory temperature, based on a network card temperature, etc. Additionally or alternatively, the PPM can control platform performance based on a difference between a current temperature of a component and a maximum limit temperature for the component.

The PPM, including operating in PPB mode and/or PPC mode, can be enabled or disabled based on customer inputs. For example, based on the busy or non-busy period of usage, a customer can enable or disable the PPM. As another example, the PPM may be enabled or disabled by the customer to take advantage of weekdays/weekends. Furthermore, PPB mode and/or PPC mode can be invoked on the fly enabling smooth transitions between the modes.

Described herein are methods, computing systems, and non-transitory computer readable media enabling platform power management. In one example, the platform includes a processor and one or more other power consuming components. A platform power budget associated with an overall power consumed by the platform is received. A platform power measurement and at least one platform temperature measurement is received. In one example, the platform power measurement indicates the overall power consumed by the platform and the one or more platform temperature measurements indicate one or more sensed temperatures of the platform. These sensed temperatures can correspond to different components of the platform or may be indicative of an overall temperature, such as the temperature at the inlet or outlet of a power supply. The platform is also selectively operated in either PPB mode or PPC mode. In one example, a selection of PPB mode versus PPC mode can be based on static or dynamic customer input.

In one example, operating the platform in PPB mode includes characterizing an activity of the processor, for example one-time, and selectively boosting a performance level of the processor during runtime and further based on available headroom in the platform power budget. In another example, operating the platform in PPC mode includes selectively reducing the performance level of the processor based on a comparison of the platform power budget and at least one of the platform power measurement and the one or more platform temperature measurements.

In another example, operating the platform in the PPB mode further includes boosting the performance level of the processor above a TDP of the processor. In another example, operating the platform in PPC mode includes determining, based on monitoring the activity of the processor, that the processor is intensively used, and not boosting the performance level of the processor based on the determination. In yet another example, the one-time characterization of the activity of the processor yields a model based on a linear combination of weighted activity counters which are be used during runtime for monitoring the activity of the processor, as will be explained in greater detail below.

In another example, platform power management includes receiving an updated platform power budget and adjusting the performance level of the processor based on the updated platform power budget. For example, this adjustment can include boosting the performance level of the processor if the updated platform power budget is increased or this adjustment can include constraining the performance level of the processor if the updated platform power budget is reduced.

In another example, operating the platform in PPB mode includes characterizing another activity of a different, non-processor, power consuming component of the platform. Based on an offline one-time characterization, it is determined that the different power consuming component is intensively used for this other activity using online classification. Available headroom in the platform power budget is also determined and as a result, the different power consuming component's performance level is boosted.

Features described in the examples above, and in further detail below, are not meant to be limited to only be combined with the other features described in the particular described example. Any of the features of the examples above and below can be combined with any features of other examples. Moreover, features of the examples described above and below can also be eliminated. The particular features described in a particular example above, and in further detail in the description below and in the figures, are not inextricably tied to each other.

Figure 1:
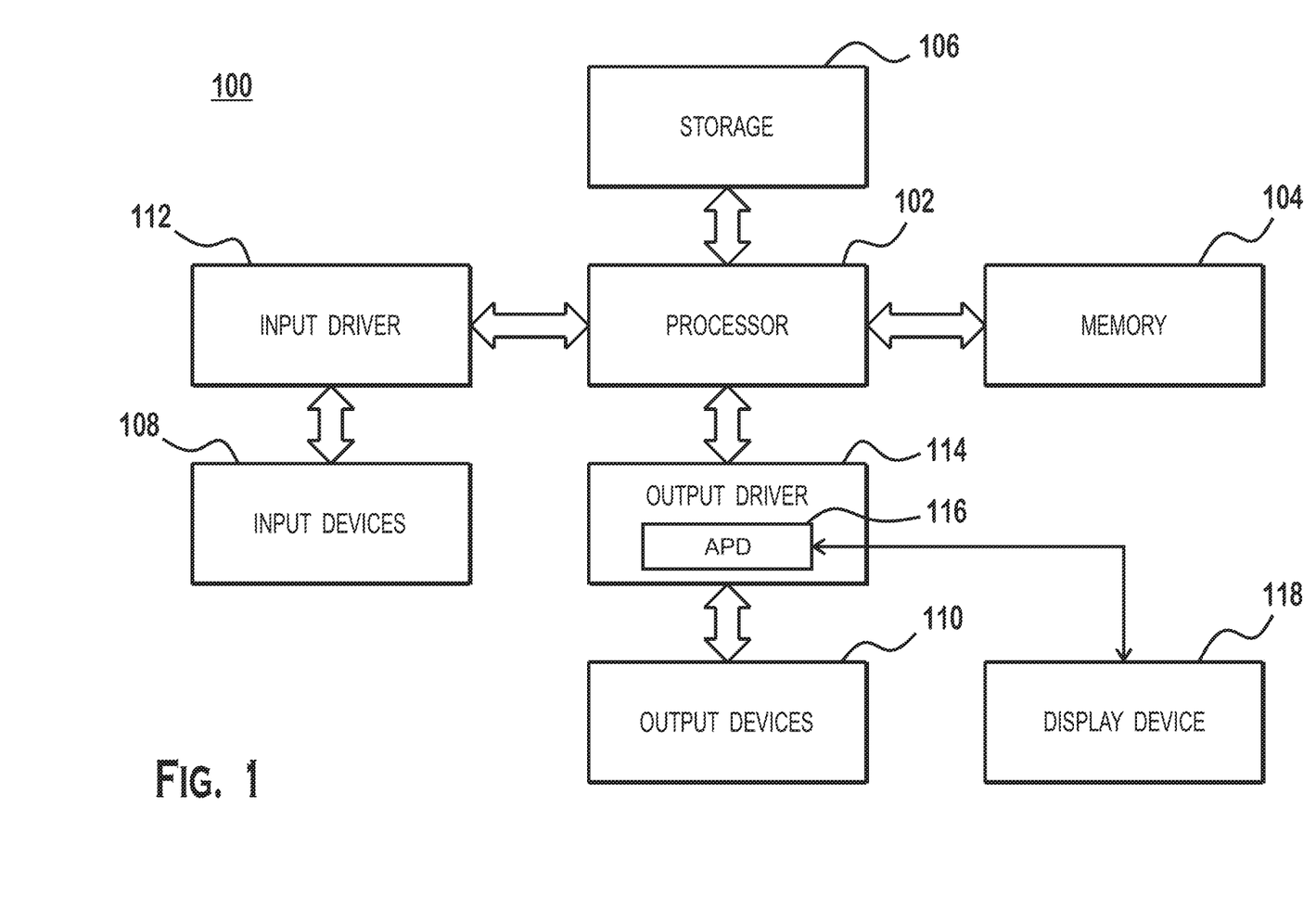
FIG. 1 is a block diagram depicting an example device in which one or more features of the disclosure can be implemented.

FIG. 1 is a block diagram of an example device 100 in which one or more features of the disclosure can be implemented. The device 100 can include, for example, a computer, a gaming device, a handheld device, a set-top box, a television, a mobile phone, or a tablet computer. The device 100 includes a processor 102, a memory 104, a storage 106, one or more input devices 108, and one or more output devices 110. The device 100 can also optionally include an input driver 112 and an output driver 114. It is understood that the device 100 can include additional components not shown in FIG. 1.

In various alternatives, the processor 102 includes a central processing unit (CPU), a graphics processing unit (GPU), a CPU and GPU located on the same die, or one or more processor cores, wherein each processor core can be a CPU or a GPU. In various alternatives, the memory 104 is located on the same die as the processor 102, or is located separately from the processor 102. The memory 104 includes a volatile or non-volatile memory, for example, random access memory (RAM), dynamic RAM, or a cache.

The storage 106 includes a fixed or removable storage, for example, a hard disk drive, a solid state drive, an optical disk, or a flash drive. The input devices 108 include, without limitation, a keyboard, a keypad, a touch screen, a touch pad, a detector, a microphone, an accelerometer, a gyroscope, a biometric scanner, or a network connection (e.g., a wireless local area network card for transmission and/or reception of wireless IEEE 802 signals). The output devices 110 include, without limitation, a display, a speaker, a printer, a haptic feedback device, one or more lights, an antenna, or a network connection (e.g., a wireless local area network card for transmission and/or reception of wireless IEEE 802 signals).

The input driver 112 communicates with the processor 102 and the input devices 108, and permits the processor 102 to receive input from the input devices 108. The output driver 114 communicates with the processor 102 and the output devices 110, and permits the processor 102 to send output to the output devices 110. It is noted that the input driver 112 and the output driver 114 are optional components, and that the device 100 will operate in the same manner if the input driver 112 and the output driver 114 are not present. The output driver 116 includes an accelerated processing device ("APD") 116 which is coupled to a display device 118. The APD accepts compute commands and graphics rendering commands from processor 102, processes those compute and graphics rendering commands, and provides pixel output to display device 118 for display. As described in further detail below, the APD 116 includes one or more parallel processing units to perform computations in accordance with a single-instruction-multiple-data ("SIMD") paradigm. Thus, although various functionality is described herein as being performed by or in conjunction with the APD 116, in various alternatives, the functionality described as being performed by the APD 116 is additionally or alternatively performed by other computing devices having similar capabilities that are not driven by a host processor (e.g., processor 102) and provide graphical output to a display device 118. For example, it is contemplated that any processing system that performs processing tasks in accordance with a SIMD paradigm may perform the functionality described herein. Alternatively, it is contemplated that computing systems that do not perform processing tasks in accordance with a SIMD paradigm performs the functionality described herein.

Figure 2:
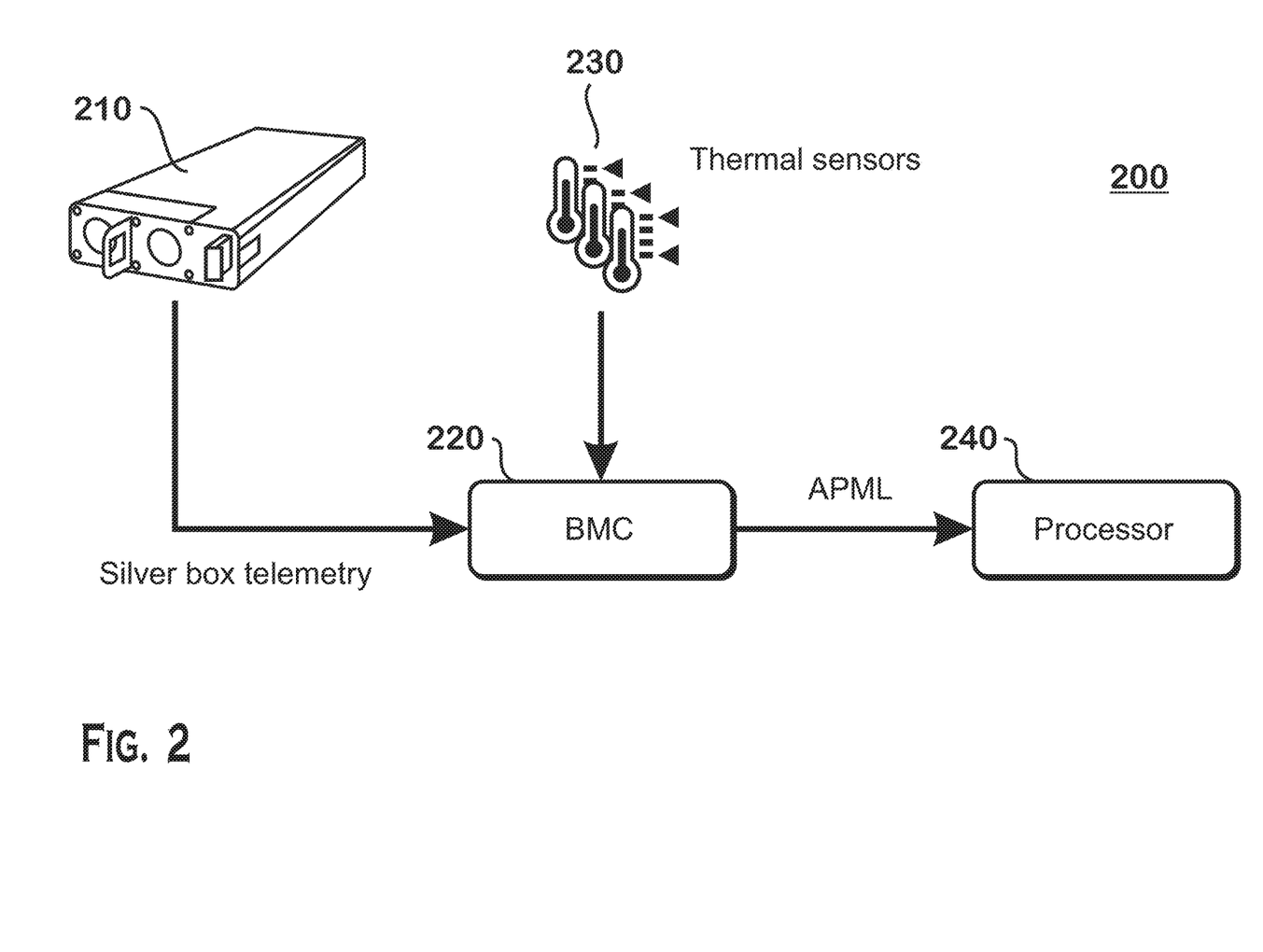
FIG. 2 is a system diagram depicting an example of one or more inputs to a baseboard management controller (BMC) and the BMC output to a coupled processor in a platform.

FIG. 2 is a system diagram depicting an example platform for platform power management. The example system depicted in FIG. 2 is not meant to be comprehensive of all components in a platform, but rather to depict some of the components of interest when implementing platform power management. FIG. 2 depicts a Baseboard Management Controller (BMC) 220 that is coupled to a power supply unit 210 to receive one or more platform power measurements, which in one example, may be referred to as silver box telemetry or power supply telemetry. FIG. 2 further depicts the BMC 220 coupled to one or more thermal sensors 230 to receive one or more temperature measurements of the platform. A temperature measurement can be of a particular component of the platform or may be a temperature indicating an overall temperature of the system, for example, a temperature measurement of an outlet temperature of a fan of the power supply unit 210. The BMC 220 is coupled to processor 240 via an interface, such as an Advanced Platform Management Link (APML) SMBus version 2.0 compatible 2-wire processor slave interface as depicted. In other examples, the BMC 220 can be coupled to the processor 240 by an I²C link, SBI, SMBUs v2.0 compatible interface, or another suitable interface. Although the interface between the BMC 220 and processor 240 is depicted as one-directional, the BMC can also receive, for example, indications of the temperature and power of the processor 240.

Although FIG. 2 depicts receiving platform level power measurements from power supply unit 210, alternatively, the PPM can use power models of individual platform components such as memory, I/O, GPU, network cards, fan power, etc. to calculate a sum total platform power.

Figure 3:
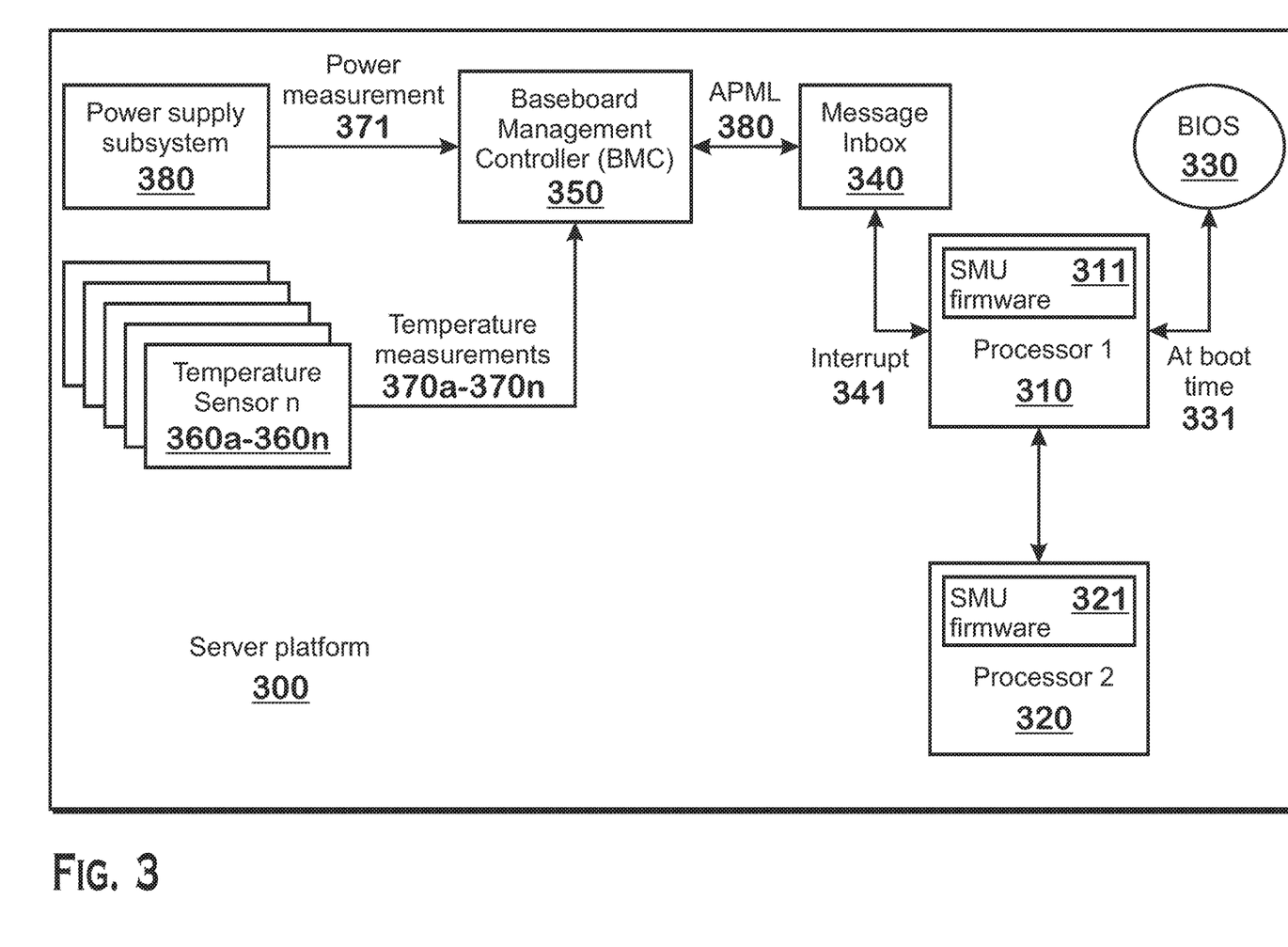
FIG. 3 is block diagram depicting an example server platform.

FIG. 3 is a block diagram depicting an example server platform 300 in accordance with the teachings herein. Server platform 300 as depicted in FIG. 3 includes processor 1 310 and processor 2 320 coupled by an inter-processor socket communication link 312, however, some server platforms may include a single processor or may include more than two processors. In the example depicted in FIG. 3, processor 1 310 includes system management unit (SMU) firmware 311 and processor 2 includes SMU firmware 321. Although SMU firmware 311 and 321 are depicted included within processor 1 310 and processor 2 320, respectively, one should recognize that the firmware may be included in a separate storage or memory, such as non-volatile memory.

FIG. 3 further depicts processor 1 310 coupled to BIOS 330. In one example, BIOS 330 stores parameters for controlling platform power management that are supplied via connection 331 to processor 1 310 and to SMU firmware 321 at boot time. Parameters for controlling PPM can include, for example, whether to operate in PPB or PPC mode. Message inbox 340 is also coupled to processor 1 310 and one or more interrupts 341 can be passed between message inbox 340 and processor 1 to effect platform power management on the server platform 300.

FIG. 3 further depicts BMC 350 coupled to the message inbox 340 via an APML. Additionally or alternatively, BMC 350 can be coupled to message inbox 340 via an I²C connection. BMC 350 is coupled to a power supply subsystem 380 to receive one or more platform power measurements 371, which in one example, may be referred to as silver box telemetry or power supply telemetry. FIG. 3 further depicts the BMC 350 coupled to one or more temperature sensors 360a-360n to receive one or more temperature measurements 370a-370n of the platform. A temperature measurement can be of a particular component of the platform or may be a temperature indicating an overall temperature of the system, for example, a temperature measurement of an outlet temperature of a fan of the power supply subsystem 380. FIG. 3 does not depict all possible components that one of ordinary skill in the art would recognize as conventionally included in a server platform such as peripherals, graphics processors and/or graphics processing cards, system memory, storage, and associated busses and connections. In some examples, a temperature measurement can be taken from any combination of components included in the server platform 300.

Figure 4:
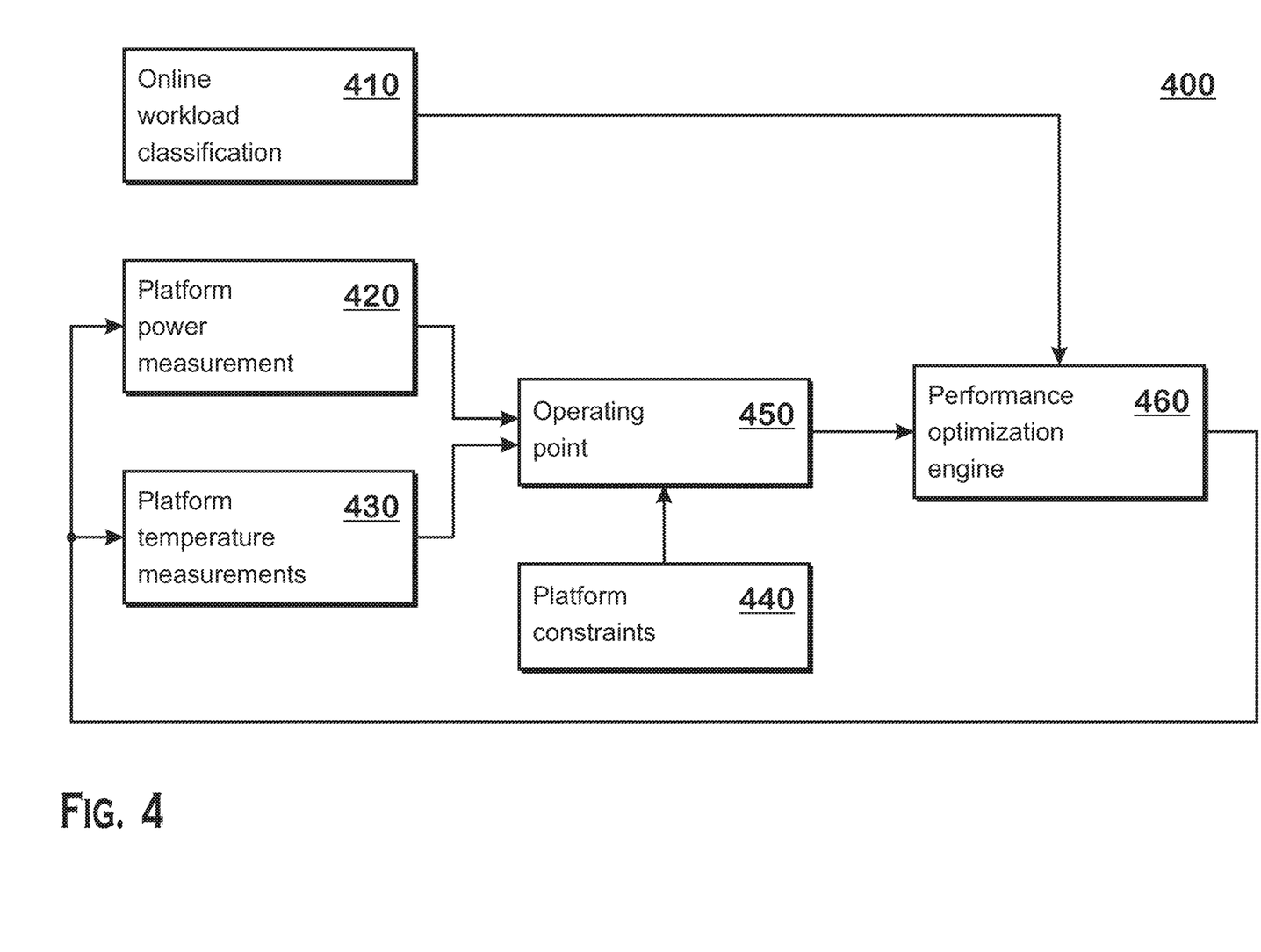
FIG. 4 is a block diagram depicting an example platform power management system.

FIG. 4 is a block diagram depicting an example platform power management system 400. Online workload classification 410 resides as part of SMU firmware. Online workload classification 410 includes assessing workload characteristics to enable optimal allocation of platform power. Depending on a particular workload, one or more components of the platform could be intensively utilized, and thus, could consume a large amount of power and run hot. Components of the platform can include, for example, a network interface card (NIC), a storage disk, a processor, system memory, a graphics processing unit (GPU), other input/output (I/O) devices, etc. Online workload classification 410 includes estimating the relative importance of each component of the platform for a current workload based on received activity signals. In one example, online workload classification 410 includes characterizing an activity by linearly combining a component's activity represented by an activity counter ($C_n$) and a weight of the activity ($w_n$). The weight of the activity ($w_n$) can be determined, for example, through offline analysis. An example of a characterization of a workload through linear combination is provided in equation (1):

$$\text{Workload characterization} = w_0 + w_1 * C_1 + w_2 * C_2 \ldots + w_n * C_n \quad (1)$$

For a known range of the workload characterization, equation (1) can be framed to indicate a characteristic of an activity. For example, equation (1) can be framed to range in values from 0 to 10. Further, in one example, equation (1) can be used to characterize the workload of a processor. In this case, for example, if the value of equation (1) is below 5, the workload is considered non-processor intensive. If the value of equation (1) is 5 or above, then the workload is considered processor intensive. Increasing the processor performance level by increasing its frequency will help overall platform performance only if the workload is considered to be processor intensive. If the workload is considered to be non-processor intensive, such as if the workload is memory, I/O, or GPU intensive, then increasing the frequency of the processor does not help overall platform performance. As such, offline workload characterization provides a clear understanding of the relative importance of a component, for example by a determination of weights, for a given activity and enables the PPM to optimize platform performance via online classification using the weights.

An example use of equation (1) is provided below to characterize the workload of a central processing unit (CPU) as $WC_{CPU}$, the workload of a GPU as $WC_{GPU}$, and the workload of memory as $WC_{MEM}$:

$$WC_{CPU} = a_0 + a_1 * C_{CPU1} + a_2 * C_{CPU2} \ldots + a_n * C_{CPUn}, \quad (2)$$

$$WC_{GPU} = b_0 + b_1 * C_{GPU1} + b_2 * C_{GPU2} \ldots + b_n * C_{GPUn}, \quad (3)$$

$$WC_{MEM} = c_0 + c_1 * C_{MEM1} + c_2 * C_{MEM2} \ldots + C_n * C_{MEMn}, \quad (4)$$

wherein, $a_0, a_1, a_2, \ldots a_n$, $b_0, b_1, b_2, \ldots b_n$, and $c_0, c_1, c_2, \ldots c_n$, are activity weights for the CPU, GPU, and memory, respectively, obtained through offline analysis or online profiling, and $C_{CPU1}, C_{CPU2}, \ldots C_{CPUn}, C_{GPU1}, C_{GPU2}, \ldots C_{GPUn}$, and $C_{MEM1}, C_{MEM2}, \ldots C_{MEMn}$ are activity counters for the CPU, GPU, and memory, respectively. The workload characterizations can then be used by the performance optimization engine 460 described below. In one example, GPU counters $C_{GPU1}, C_{GPU2}, \ldots C_{GPUn}$ are computed in the GPU itself and the result is passed on to the CPU periodically.

Server platforms increasingly have one or more GPUs. Each GPU has hundreds of compute units that are well-adapted for machine learning. The GPUs are also capable of supporting significant parallelism, for example simultaneously executing 64 or 128 threads. Using the capabilities of the GPUs, the model online can be characterized, whereby weights are tuned, for example without turning on PPM, when the workloads are being run. In one example, the weights are tuned until an objective is satisfied. For instance, the weights are tuned until an error of predicting the activity of a processor, GPU, memory, etc. is low enough and within a target, for example within 3% to 5%. Once the weights are tuned, PPM will classify the workloads online and make a decision for controlling the server platform based on platform headroom in accordance with the teachings herein. The characterization to tune the weights and the classifying of activities are done by the SMU of the processor.

Platform power measurement 420 as depicted in FIG. 4 includes measuring a total power consumed by an entire server platform. A BMC provides an indication of the total power consumed to a system management unit (SMU) embodied in firmware that runs on a processor. The indication is provided via a link to the processor, such as an I²C connection. Additionally or alternatively, the link can be an APML. In one example, the power measurement indication can be provided periodically by the BMC. FIGS. 2 and 3 provide system diagrams depicting an example of one or more power inputs to the BMC and the BMC passes them onto a coupled processor.

Platform temperature measurements 430 as depicted in FIG. 4 includes measuring, via one or more thermal sensors, a temperature associated with one or more platform components. The BMC provides periodic indications of the corresponding temperatures to the SMU. Additionally or alternatively, the BMC can provide a temperature delta of a current temperature compared to a worst-case maximum temperature for a given temperature sensor. In one example, the worst-case maximum temperature is provided by the customer and is based on customer experience or preference. FIG. 4 provides a system diagram depicting an example of one or more temperature measurement inputs to the BMC and the BMC indications output to a coupled processor.

Platform constraints 440 as depicted in FIG. 4 includes power and/or thermal constraints for the platform. Platform constraints 440 are configurable, for example by the customer, and can either be provided during boot-up as a static value that resides as part of BIOS firmware or can be provided dynamically by the BMC to the processor. In one example, the platform constraints 440 are provided through messages passed by the BMC to the processor using APML. For example, a platform power budget of 1200 W is set by the customer on system boot-up. The total platform power budget can be changed dynamically to a value of 800 W or 1400 W, for example, based on busy and non-busy times of the customer's business.

Operating point 450 as depicted in FIG. 4 includes selecting either PPB mode or PPC mode. In one example, the mode is set by the customer. Similar to the platform power constraints 440, in operating point 450, the customer can select the mode in a static fashion through the BIOS. Additionally or alternatively, the customer can dynamically select the mode through, for example, APML messages while the platform is in operation. PPB mode and PPC mode can be each selectively enabled or disabled. In one example, when PPB mode and PPC mode are in operation, PPC mode specifies the power limit in watts within which the PPB mode can operate.

Performance optimization engine 460 as depicted in FIG. 4 is a part of the SMU. The performance optimization engine 460 controls, for example, the frequency of the processor based on a voltage versus frequency curve associated with the performance of the processor and based on the mode selected in operating point 450. The SMU receives APML messages from the BMC that include, for example, indications of power and temperature measurements. The SMU calculates platform power headroom and temperature headroom based on the measurements and associated limits. Further, as referenced above, the SMU uses the output of the online workload classification 410 to determine if increasing the frequency of the processor would benefit the activity.

Using the above example equations (2), (3), and (4), below is an example decision tree used by the SMU to determine whether to boost a performance level of a CPU:

If ($WC_{CPU}>=5$) then it is a CPU intensive activity, boosting CPU performance level is beneficial;

Else If ($WC_{MEM}>=5$) then it is a memory intensive activity, limiting CPU performance level is beneficial. Here, it is assumed that $WC_{CPU}<5$.

Else if ($WC_{GPU}>=5$) then it is a GPU intensive activity, limiting CPU performance level is beneficial. Here, it is again assumed that $WC_{CPU}<5$.

If, for example, the SMU determines that the activity would benefit from an increase in the operating frequency of the processor, for example if equation (2) returns a value greater than or equal to 5, then the power and temperature measurement indications are used to boost the performance level of the processor. In one example, a proportional-integral-derivative (PID) controller is used to change the processor frequency so that control of the system is stable and safely converges to a target frequency.

Server platforms can include one or more processors. If the server platform includes a plurality of processors, after a headroom calculation is done, a power budget is either divided up equally among the plurality of processors, is apportioned based on results from classifying the workloads running on each processor, respectively, or is otherwise suitably split among the processors.

Figure 5:
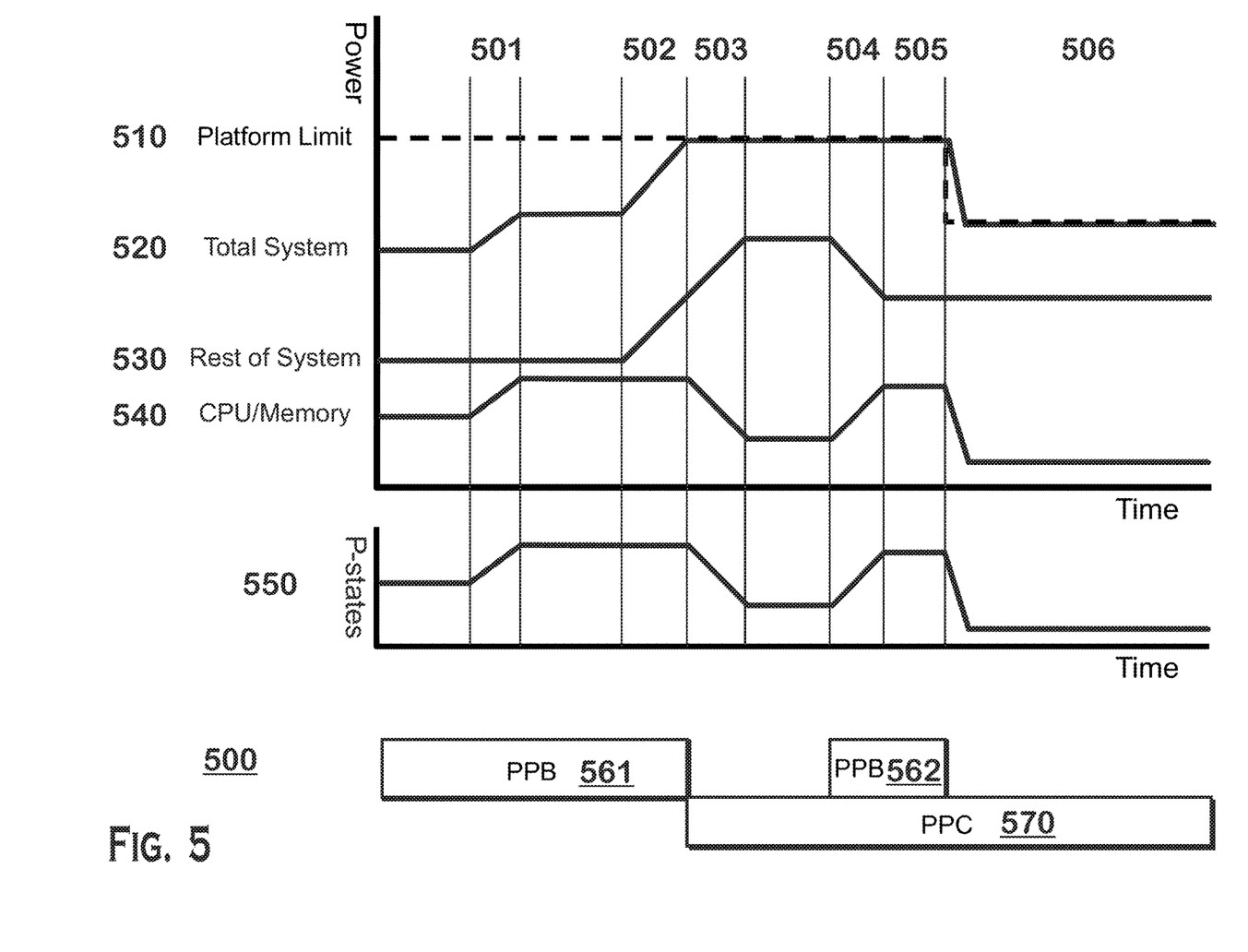
FIG. 5 is a diagram depicting the operation of an example platform when operating in platform power boost (PPB) and platform power cap (PPC) modes.

FIG. 5 is a diagram depicting the operation of an example platform when operating in PPB and PPC modes. The platform power limit 510 depicted in FIG. 5 may also be referred to as a platform power budget. The processor power 540 depicted in FIG. 5 indicates a power consumed by the processor in the platform, the rest of system power 530 indicates a power consumed by one or more other components of the platform, and total system power 520 indicates a total sum platform power consumed by the processor power 540 and the one or more other components of the rest of system power 530. The P-states 550 indicates a P-state of the processor, which in one example is a performance level of the processor. The performance level of the processor can be viewed as a frequency and/or voltage level of the processor. As can be seen in FIG. 5, the processor power 540 tracks the P-states 550, or performance level, of the processor.

In PPB mode 561, prior to time period 501, the SMU receives indications of power and temperature from the BMC, determines thermal and power headroom, and also characterizes activities of the platform. The SMU determines that a workload is processor intensive and that there is total platform headroom available, and thus during time period 501, the SMU boosts the performance level of the processor as depicted by the P-states 550 increasing during time period 501. Likewise, the processor power 540 increases during time period 501, and as such, the total system power 520 also increases.

During time period 502, the rest of system power 530 increases while the processor power 540 remains the same, thus the total system power 520 increases up to the platform power limit 510 as depicted in FIG. 5.

During time period 503, the rest of system power 530 continues to increase. This could be due to, for example, an I/O intensive activity. In order for the platform's total system power 520 to not exceed the platform power limit 510, the SMU operates in PPC mode 570 and lowers the performance level of the processor as depicted by the P-states 550 decreasing during time period 503, and thus lowers the processor power 540 to offset the increase in rest of system power 530.

A server platform can simultaneously operate in both PPB and PPC mode, such as depicted during time periods 504 and 505. During time period 504, the rest of system power 530 decreases, which affords total platform headroom, and thus the SMU operates in accordance with PPB mode 562 and boosts the performance level of the processor as depicted by the P-states 550 increasing during time period 504.

The platform power limit 510 is reduced at the start of time period 505. The platform power limit 510 is updated, for example, by the customer to manage cooling costs. As a result of the lowered platform power limit 510, the SMU, operating in accordance with PPC mode, reduces the performance level of the processor as depicted by the P-states 550 decreasing at the start of time period 506 to decrease the processor power 540 such that the total system power 520 does not exceed the platform power limit 510.

Figure 6:
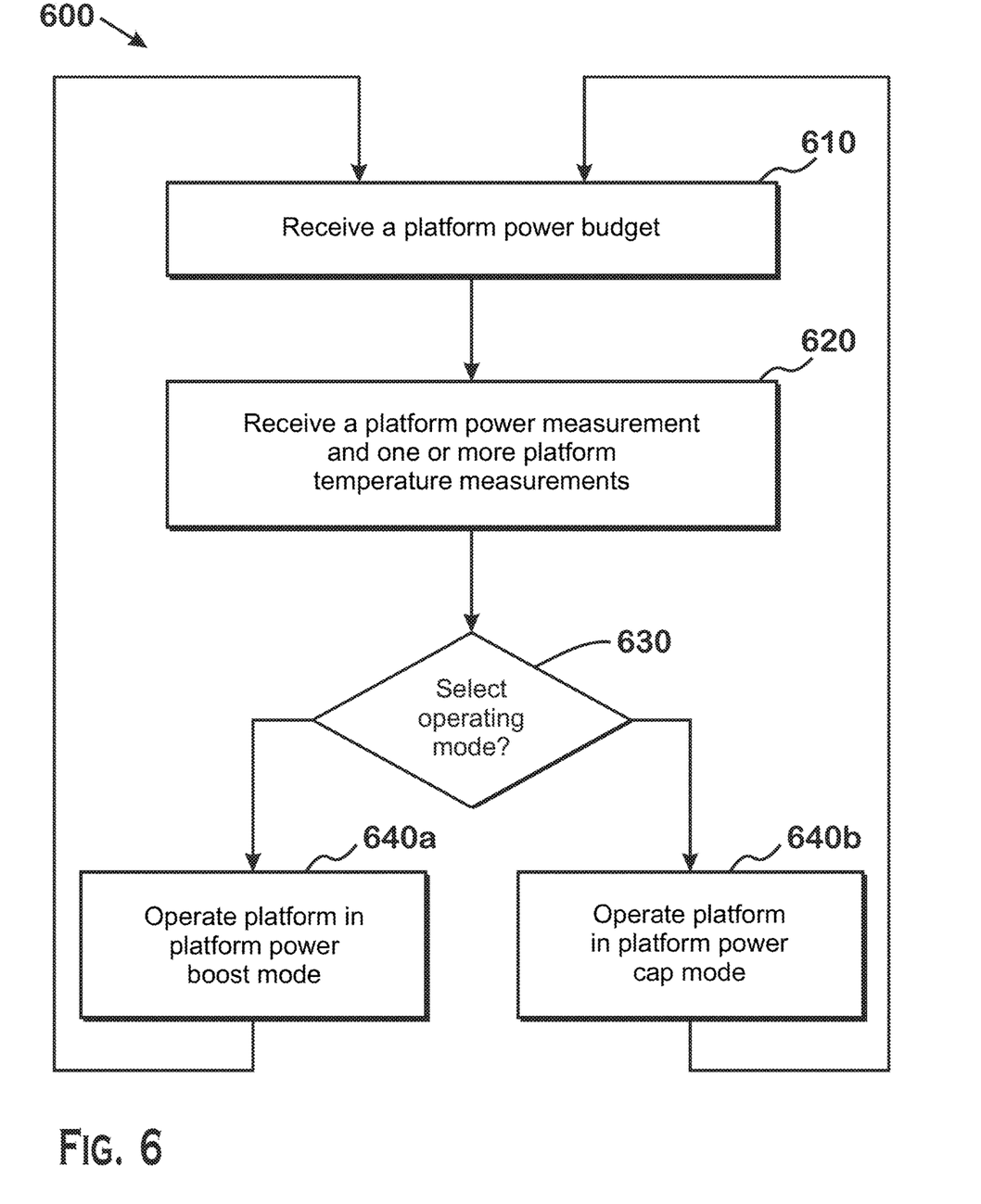
FIG. 6 is a flow diagram depicting an example method of platform power management.

FIG. 6 is a flow diagram depicting an example method 600 of platform power management. At 610, a platform power budget is received. In accordance with the description above, the platform power budget may also be referred to as a platform power limit and it may, for example, be set by the customer statically or dynamically. At 620, a platform power measurement and one or more platform temperature measurements are received. At 630, an operating mode of a plurality of operating modes is selected. The selection of the operating mode can be configured by the customer statically or dynamically. For example, a first operating mode, which is the PPB mode, is selected at 630 and thus the method moves to 640a. In another example, a second operating mode, which is the PPC mode, is selected at 630 and thus the method moves to 640b. As depicted in FIG. 6, the method can return to 610 to receive an updated platform power budget. Additionally or alternatively, the method can return to 620 to receive updated platform power and platform temperature measurements or the method can return to 630 to select an updated operating mode.

In one example, operating the platform in PPB mode 640a as depicted in FIG. 6 can include classifying an activity of a processor of the platform. In another example, operating the platform in PPB mode 640a can also include selectively boosting a performance level of the processor based on the classifying and further based on available headroom in the platform power budget. In yet another example, operating the platform in PPB mode 640a can also include boosting the performance level of the processor above a TDP of the processor. In yet another example, operating the platform in PPB mode 640a can also include determining, based on the characterizing of the activity, that the processor is intensively used for the activity and boosting the performance level of the processor. In yet another example, operating the platform in PPB mode 640a can also include classifying an activity of a second power consuming component, for example a GPU. In yet another example, operating the platform in PPB mode 640a can also include determining, based on the classifying of the activity of the second power consuming component, that the second power consuming component is intensively used for the activity. In yet another example, operating the platform in PPB mode 640a can also include determining that headroom is available in the platform power budget and boosting a performance level of the second power consuming component.

In one example, operating the platform in PPC mode 640b as depicted in FIG. 6 can include selectively reducing the performance level of the processor based on a comparison of the platform power budget and at least one of the platform power measurement and the one or more platform temperature measurements.

The PPM, by monitoring temperatures of the platform and total power consumption of the platform, can exploit platform-level headroom to achieve optimal performance for the platform. Through the mechanisms described above, the PPM can account for intrinsic variations due to part differences, differing platform capabilities, such as differing cooling capabilities, and environmental conditions in the system to optimize performance. For example, a processor in a platform is specified to operate at a maximum power consumption level of 200 W. However, the platform also includes a cooling system that can cool 220 W. The PPM can take advantage of the capabilities of the cooling system to operate the processor with higher power. Also, faster and/or lower power parts resulting from process variation can be used in conjunction with the PPM to achieve an even better platform level performance. In this example, a part which can inherently run faster within a same power envelope will provide larger platform performance gains when TDP is exceeded through the use of platform power management in accordance with the teachings herein.

Although the description above focuses on controlling the performance level of a processor, the teachings herein are also applicable to other platform components, such as memory or I/O. For example, with link speed control and/or bandwidth management, the PPM can increase I/O speeds, such as peripheral component interconnect express (PCIe) speeds, for network or disk intensive activities during PPB mode. Similarly, in PPB mode, the PPM can provide additional power to memory to support activities that demand higher memory bandwidth.

The PPM can also control a power budget of another power consuming platform component that is not a processor, such as memory or I/O in order to satisfy platform and rack level power constraints.

It should be understood that many variations are possible based on the disclosure herein. Although features and elements are described above in particular combinations, each feature or element can be used alone without the other features and elements or in various combinations with or without other features and elements.

The methods provided can be implemented in a general purpose computer, a processor, or a processor core. Suitable processors include, by way of example, a general purpose processor, a special purpose processor, a conventional processor, a digital signal processor (DSP), a plurality of microprocessors, one or more microprocessors in association with a DSP core, a controller, a microcontroller, Application Specific Integrated Circuits (ASICs), Field Programmable Gate Arrays (FPGAs) circuits, any other type of integrated circuit (IC), and/or a state machine. Such processors can be manufactured by configuring a manufacturing process using the results of processed hardware description language (HDL) instructions and other intermediary data including netlists (such instructions capable of being stored on a computer readable media). The results of such processing can be maskworks that are then used in a semiconductor manufacturing process to manufacture a processor which implements features of the disclosure.

The methods or flow charts provided herein can be implemented in a computer program, software, or firmware incorporated in a non-transitory computer-readable storage medium for execution by a general purpose computer or a processor. Examples of non-transitory computer-readable storage mediums include a read only memory (ROM), a random access memory (RAM), a register, cache memory, semiconductor memory devices, magnetic media such as internal hard disks and removable disks, magneto-optical media, and optical media such as CD-ROM disks, and digital versatile disks (DVDs).

What is claimed is:

1. A method performed by a platform power manager (PPM), the method comprising:
   receiving a platform power budget associated with an overall power consumed by a platform, wherein the platform includes a processor and at least one other power consuming component;
   receiving a platform power measurement and one or more platform temperature measurements, wherein the platform power measurement indicates the overall power consumed by the platform and the one or more platform temperature measurements indicate one or more sensed temperatures of the platform; and
   selectively operating the platform in either a platform power boost (PPB) mode or a platform power cap (PPC) mode;
   wherein operating the platform in the PPB mode includes:
      classifying a workload that at least in part uses the processor; and
      selectively boosting a performance level of the processor based on the classifying and further based on available headroom in the platform power budget; and
   wherein operating the platform in the PPC mode includes:
      selectively reducing the performance level of the processor based on a comparison of the platform power budget and at least one of the platform power measurement and the one or more platform temperature measurements.

2. The method of claim 1, wherein the operating the platform in the PPB mode further includes boosting the performance level of the processor above a thermal design point (TDP) of the processor.

3. The method of claim 1, wherein the operating the platform in the PPB mode further includes:
   determining, based on the classifying of the workload, that the processor is intensively used for the workload; and
   boosting the performance level of the processor.

4. The method of claim 1, wherein the classifying the workload of the processor is based on a linear combination of weighted activity counters and wherein the weighted activity counters are based on weights obtained using offline characterization.

5. The method of claim 1, further comprising:
   receiving an updated platform power budget subsequent to receiving the platform power budget, wherein the updated platform power budget is different than the platform power budget; and
   adjusting the performance level of the processor based on the updated platform power budget.

6. The method of claim 1, wherein the operating the platform in the PPB mode further includes:
   classifying a second workload that at least in part uses a second power consuming component of the at least one other power consuming component;
   determining, based on the classifying of the second workload, that the second power consuming component is intensively used for the second workload;
   determining that headroom is available in the platform power budget; and
   boosting a performance level of the second power consuming component.

7. A computing system operable to perform platform power management, the computing system comprising:
   memory including operational instructions thereon;
   a processor and at least one other power consuming component; and
   a baseboard management controller (BMC) configured to provide the processor with:
      an indication of a platform power budget associated with an overall power consumed by a platform, wherein the platform includes the processor and the at least one other power consuming component;
      an indication of a platform power measurement that indicates the overall power consumed by the platform; and
      one or more indications of one or more corresponding platform temperature measurements that indicate one or more sensed temperatures of the platform;
   wherein the processor, when executing the operational instructions, is configured to:
      selectively operate the platform in either a platform power boost (PPB) mode or a platform power cap (PPC) mode;
   wherein the processor, when operating the platform in the PPB mode, is further configured to:
      classify a workload that at least in part uses the processor; and
      selectively boost a performance level of the processor based on the classification of the workload and further based on available headroom in the platform power budget; and
   wherein the processor, when operating the platform in the PPC mode, is further configured to:
      selectively reduce the performance level of the processor based on a comparison of the platform power budget and at least one of the platform power measurement and the one or more platform temperature measurements.

8. The computing system of claim 7, wherein the BMC is coupled to the processor via an advanced platform management link (APML).

9. The computing system of claim 7, wherein the processor, when operating the platform in the PPB mode, is further configured to boost the performance level of the processor above a thermal design point (TDP) of the processor.

10. The computing system of claim 7, wherein the processor, when operating the platform in the PPB mode, is further configured to:

determine, based on the classifying of the workload, that the processor is intensively used for the workload; and boost the performance level of the processor.

11. The computing system of claim 7, wherein the processor, when operating the platform in the PPB mode, is further configured to classify the workload of the processor based on a linear combination of weighted activity counters and wherein the weighted activity counters are based on weights obtained using offline characterization.

12. The computing system of claim 7, wherein:
the BMC is further configured to receive an updated platform power budget subsequent to receiving the platform power budget, wherein the updated platform power budget is different than the platform power budget; and
the processor is further configured to adjust the performance level of the processor based on the updated platform power budget.

13. The computing system of claim 7, wherein the processor, when operating the platform in the PPB mode, is further configured to:
classify a second workload that at least in part uses a second power consuming component of the at least one other power consuming component;
determine, based on the classification of the second workload, that the second power consuming component is intensively used for the second workload;
determine that headroom is available in the platform power budget; and
boost a performance level of the second power consuming component.

14. A non-transitory computer-readable medium storing instructions that, when executed by a processor, cause the processor to:
receive a platform power budget associated with an overall power consumed by a platform, wherein the platform includes the processor and at least one other power consuming component;
receive a platform power measurement that indicates the overall power consumed by the platform;
receive one or more platform temperature measurements that indicate one or more sensed temperatures of the platform; and
selectively operate the platform in either a platform power boost (PPB) mode or a platform power cap (PPC) mode;
wherein instructions for operating the platform in the PPB mode, when executed by the processor, further cause the processor to:
classify a workload that at least in part uses the processor; and
selectively boost a performance level of the processor based on the classification of the workload and further based on available headroom in the platform power budget; and
wherein instructions for operating the platform in the PPC mode, when executed by the processor, further cause the processor to:
selectively reduce the performance level of the processor based on a comparison of the platform power budget and at least one of the platform power measurement and the one or more platform temperature measurements.

15. The non-transitory computer-readable medium of claim 14, wherein, the instructions for operating the platform in the PPB mode, when executed by the processor, further cause the processor to:
boost the performance level of the processor above a thermal design point (TDP) of the processor.

16. The non-transitory computer-readable medium of claim 14, wherein, the instructions for operating the platform in the PPB mode, when executed by the processor, further cause the processor to:
determine, based on the classification of the workload, that the processor is intensively used for the workload; and
boost the performance level of the processor.

17. The non-transitory computer-readable medium of claim 14, wherein, the instructions for operating the platform in the PPB mode, when executed by the processor, further cause the processor to:
classify the workload of the processor based on a linear combination of weighted activity counters, wherein the weighted activity counters are based on weights obtained using offline characterization.

18. The non-transitory computer-readable medium of claim 14, wherein, the instructions, when executed by the processor, further cause the processor to:
receive an updated platform power budget subsequent to receiving the platform power budget, wherein the updated platform power budget is different than the platform power budget; and
adjust the performance level of the processor based on the updated platform power budget.

19. The non-transitory computer-readable medium of claim 14, wherein, the instructions for operating the platform in the PPB mode, when executed by the processor, further cause the processor to:
classify a second workload that at least in part uses a second power consuming component of the at least one other power consuming component;
determine, based on the classification of the second workload, that the second power consuming component is intensively used for the second workload;
determine that headroom is available in the platform power budget; and
boost a performance level of the second power consuming component.

20. The non-transitory computer-readable medium of claim 14, wherein the PPB mode favors platform performance over platform power, and wherein the PPC mode favors platform power over platform performance.

* * * * *